J. H. MULLIN.
RESILIENT WHEEL.
APPLICATION FILED APR. 24, 1917.

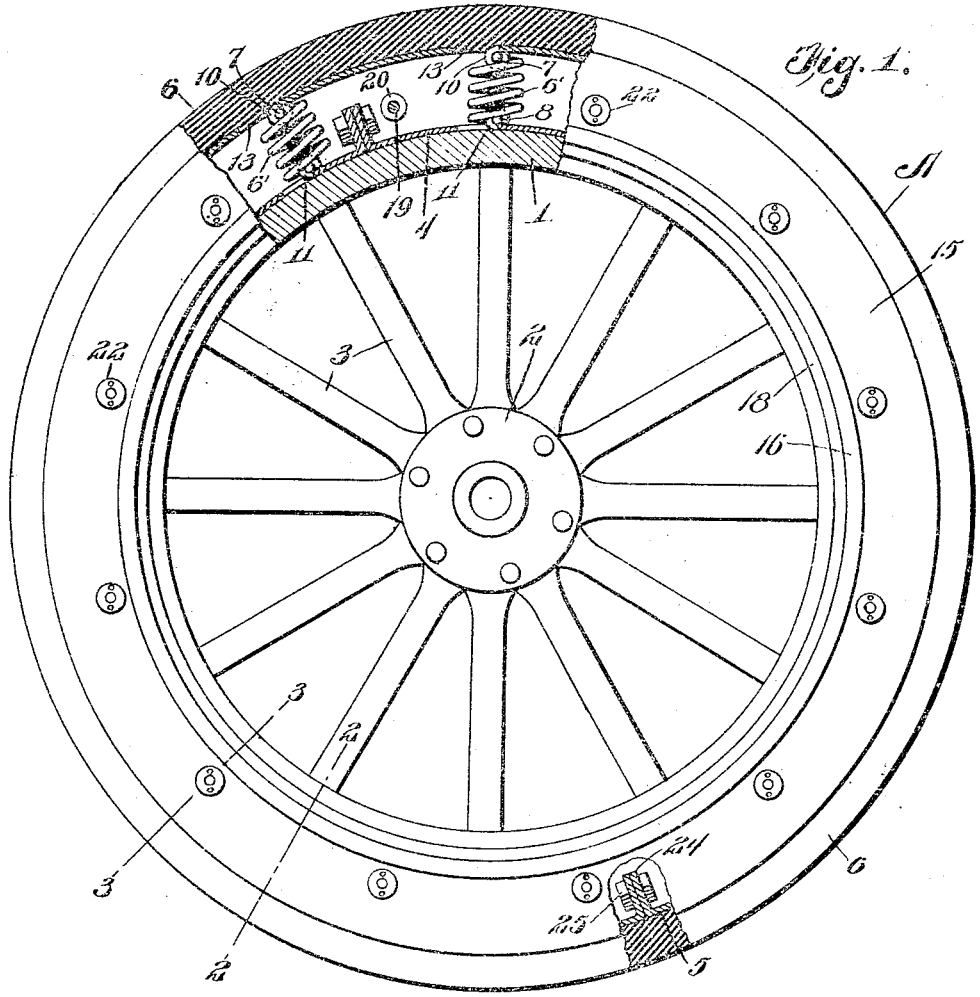
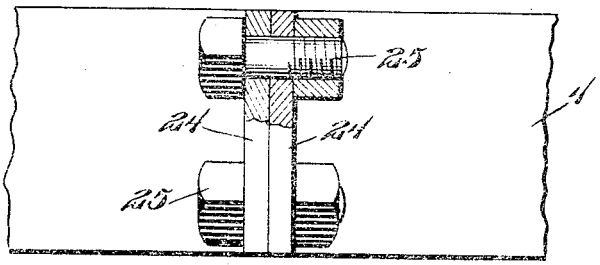

1,284,749.

Patented Nov. 12, 1918.
2 SHEETS—SHEET 2.

Witnesses:
S. R. Heinrichs
M. E. Eisenlein

Inventor
Joseph H. Mullin
By C. C. Hines,
Atty

UNITED STATES PATENT OFFICE.

JOSEPH HENRY MULLIN, OF NEW HAVEN, CONNECTICUT, ASSIGNOR OF ONE-HALF TO THOMAS RILLEY, OF NEW HAVEN, CONNECTICUT.

RESILIENT WHEEL.

1,284,749.

Specification of Letters Patent.

Patented Nov. 12, 1918.

Application filed April 24, 1917. Serial No. 164,216.

*To all whom it may concern:*

Be it known that I, JOSEPH H. MULLIN, a citizen of the United States, residing at New Haven, in the county of New Haven and State of Connecticut, have invented new and useful Improvements in Resilient Wheels, of which the following is a specification.

This invention relates to a cushioned rim for vehicle wheels, the broad object in view being to provide a construction of rim which will take the place of and overcome the necessity for the use of the ordinary pneumatic and cushion tires now in common use, incidentally doing away with the common tire troubles such as punctures and blow-outs.

One object of this invention is to provide in connection with an inner fixed rim and an outer resilient supporting rim, compression springs interposed between said inner and outer rims and connected thereto in a novel manner which will not increase the weight or impair to any degree the efficiency of the complete structure.

A further object of the invention is to provide a cushioned rim, with an attached tire, which may be sold as an article of manufacture and applied, as a combined detachable rim and tire, in lieu of a pneumatic tire, to any ordinary wheel upon which detachable tire rims are ordinarily used.

A further object of the invention is to so form the fastening means for the outer extremities of the compression springs as to provide for an interlocking engagement between the tire and outer rim which carries the tire, said interlocking engagement between the tire and rim serving to prevent longitudinal creeping movement of the tire as well as lateral shifting movement of the tire.

A further object of the invention is to combine the inner fixed rim, the springs, the housing plates or flanges, and the clamping bolts in a novel manner so that all of said parts will center themselves in relation to each other and to the felly of the wheel in conjunction with which the tire is used.

With the above and other objects in view, the invention consists in the novel construction, combination and arrangement of parts herein fully described, illustrated and claimed.

In the accompanying drawing,

Figure 1 is a side elevation partly broken away of a resilient wheel embodying the present invention.

Fig. 5 is a fragmentary plan view illustrating the means for connecting the extremities of the inner rim and the outer rim.

Figure 2:
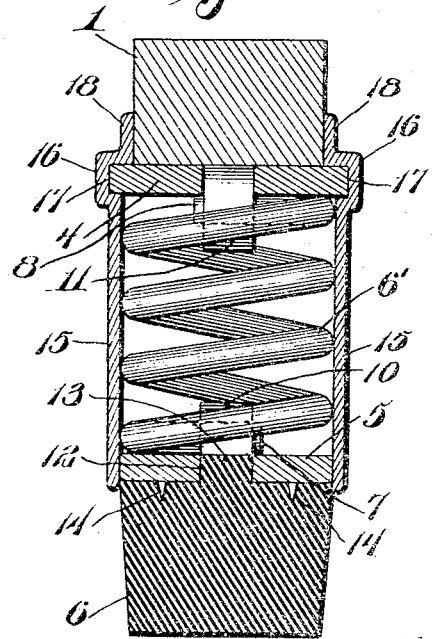
Fig. 2 is an enlarged cross section through the tire and rims on the line 2—2 of Fig. 1.
Figure 3:
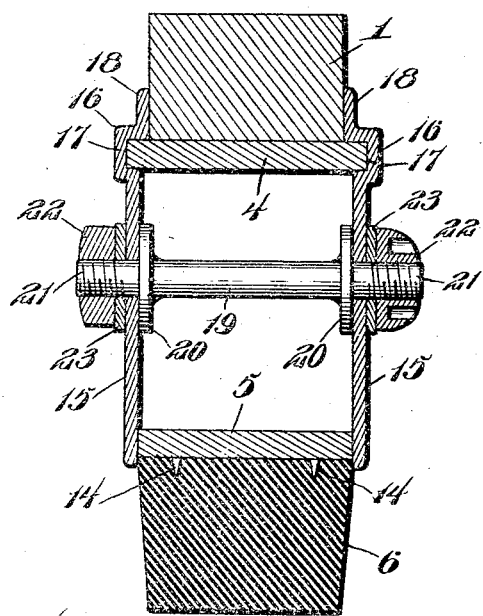
Fig. 3 is a cross section through the same on the line 3—3 of Fig. 1.
Figure 4:
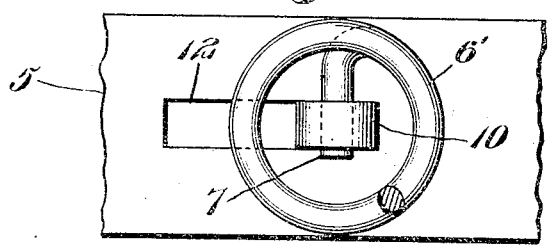
Fig. 4 is a fragmentary plan view looking toward the inner face of the outer tire carrying rim.
Figure 6:
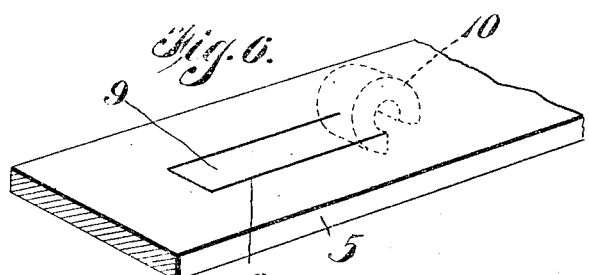
Fig. 6 is an enlarged fragmentary perspective view illustrating the manner in which the punched holding eyes or knuckles are formed on the inner and outer rims.

Referring to the drawing A designates generally a vehicle wheel comprising a felly or permanent rim 1, a hub 2 and spokes 3, all of the parts referred to being combined in the usual way and having a rigid relation to each other.

In carrying out the present invention, I employ a detachable cushioned rim and tire embodying an inner fixed rim 4 which encircles and bears directly upon the periphery of the felly 1. In addition to the inner fixed rim 4, I employ an outer tire carrying rim 5 upon which is mounted a tire 6 preferably of rubber.

Compression springs 6' are interposed between the rims 4 and 5 and arranged at equal intervals along the wheel as illustrated in Fig. 1. Each of the springs 6' terminates at its extremities in end portions 7 and 8, which, when the spring is in its final position, extend transversely of the rims 4 and 5.

The outer rim 5 is cut and punched to provide tongue-like portions 9 which are thereafter rolled inwardly to form eyes or knuckles 10 which receive the end portions of the springs at the outer end thereof. Other eyes or knuckles 11 are formed in the same way integral with the inner rim 4 and engage the inner extremities of the springs. By the construction described, no weight is added to the inner and outer rims to provide a means for fastening the spring extremities thereto and furthermore a pivotal action is allowed between each spring and the inner and outer rims. This adds materially to the resiliency of the wheel as a whole.

In forming the eyes 10 on the inner side of the outer rim 5, longitudinally elongated openings 12 are provided in said outer rim and the tire 6 is formed with a corresponding number of similarly shaped lugs 13 which are received in the openings 12, thus providing an interlocked engagement between the tire and outer rim 5 which will prevent longitudinal creeping of the tire and also lateral shifting thereof. Thus a single expedient provides for holding the outer extremities of the springs and the lugs on the tire. The outer rim 5 may also be formed with spurs 14 which are embodied in the inner face of the tire 6 when the latter is in its final position.

Arranged at opposite sides of the inner and outer rims 4 and 5 and inclosing and protecting the springs 6', are annular housing plates or flanges 15. The plates or flanges 15 are the counterparts of each other, each of said plates being offset outwardly at 16 and formed on the inner side thereof with an annular groove 17 in which the adjacent edge of the inner rim 4 is securely and firmly held. The inner rim 4 is made of greater width than the width of the felly 1 and the portions 18 of the housing plates or flanges 15 which extend inwardly beyond the inner rim 4 bear firmly against the opposite side faces of the felly 1. All of the parts just referred to therefore center themselves in relation to the felly 1.

Bolts 19 are inserted through the plates or flanges 15 in order to secure the same in fixed relation to each other and to the inner rim 4 and the felly 1. Each of said bolts is provided with stop shoulders 20 in spaced relation to each other, the outer faces of the shoulders 20 being at the same distance apart as the inner faces of the plates or flanges 15. The outer end portions 21 of the bolts are threaded to receive nuts 22 for finally securing all of the parts together and in place, 23 designating washers which are interposed between the nuts 22 and the plates or flanges 15.

Each of the rims 4 and 5 is preferably of the split or transversely divided type and formed with flanges 24 secured together by means of bolts 25. This greatly facilitates the assemblage of the parts of the resilient wheel.

From the foregoing description taken in connection with the accompanying drawings it will now be seen that the novel means for securing the compression springs to the inner and outer rims 4 and 5 does not involve any additional weight beyond the original weight of the rims themselves. Furthermore said fastening means provide for a pivotal connection between the outer and inner extremities of said springs and the inner and outer rims. Additionally, the formation of the fastening means referred to provides openings which in turn provide for the interlocked engagement referred to between the tire and outer rim. It will also be seen that by the specified formation of the said housing plates or flanges 15 and their relation to the inner rim and the felly, and by means of the use of the bolts referred to, the parts referred to are self-centering in relation to the felly and also provide for a firm clamping action between the plates 15, the rim 4 and the felly 1. This leaves the outer tire carrying rim 5 free to move and adjust itself between the housing plates or flanges 15 without any binding action.

The inner rim 4 may be a fixed part of the wheel, but I contemplate making the inner rim, outer rim, tire and the cushioning elements as a complete article of manufacture which will serve the purpose of a combined detachable rim and tire, which may be sold as such and applied in place of any ordinary detachable rim and pneumatic tire to rims of wheels adapted to receive any of the various forms of detachable rims in common use. It is therefore to be understood that the invention is designed to embody the use of my improved structure either as a fixed part of the wheel or as a detachable part, as desired.

I claim:

In a resilient wheel, the combination of an inner fixed rim, an outer tire carrying rim in spaced and normally concentric relation thereto, the outer rim having portions punched centrally and inwardly therefrom and rolled to form securing eyes and adjacent lug-receiving openings, springs interposed between the inner and outer rims and having their outer end portions extended transversely of the outer rim and inserted through said eyes, and a tire encircling said outer rim and having lugs on its inner face fitting in said openings in the outer rim.

In testimony whereof I affix my signature.

JOSEPH HENRY MULLIN.

Copies of this patent may be obtained for five cents each, by addressing the "Commissioner of Patents, Washington, D. C."